(12) United States Patent
Bocchiola

(10) Patent No.: US 7,078,870 B2
(45) Date of Patent: Jul. 18, 2006

(54) SIMPLIFIED TOPOLOGY FOR HID LAMPS

(75) Inventor: Cesare Bocchiola, Settimo (IT)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/951,183

(22) Filed: Sep. 27, 2004

(65) Prior Publication Data

US 2005/0067981 A1    Mar. 31, 2005

Related U.S. Application Data

(60) Provisional application No. 60/507,637, filed on Sep. 30, 2003.

(51) Int. Cl.
*G05F 1/00* (2006.01)
*H05B 37/02* (2006.01)

(52) U.S. Cl. ............... 315/308; 315/219; 315/224; 315/291; 315/307

(58) Field of Classification Search ............... 315/291, 315/224, 307, 129–136, 308, 219, 209, 244, 315/276; 363/21, 80, 89
See application file for complete search history.

(56) References Cited

U.S. PATENT DOCUMENTS 3,531,738 A * 9/1970 Thakore ............... 331/111
6,038,146 A * 3/2000 Luo et al. ............... 363/21.16
6,051,940 A * 4/2000 Arun ............... 315/307
6,606,259 B1 * 8/2003 Cohen ............... 363/56.01
6,791,279 B1 * 9/2004 Shearer et al. ............... 315/209 R
2004/0113565 A1 * 6/2004 Fushimi ............... 315/276
2005/0007029 A1 * 1/2005 Fushimi ............... 315/200 R
2005/0024904 A1 * 2/2005 Kajouke et al. ............... 363/110

* cited by examiner

*Primary Examiner*—Don Wong
*Assistant Examiner*—Tung Le
(74) *Attorney, Agent, or Firm*—Ostrolenk, Faber, Gerb & Soffen, LLP

(57) ABSTRACT

An HID ballast includes a flyback power converter with a simplified topology that permits power factor correction while supplying constant output power to drive an inverter supplying low frequency modulated power to the HID lamp. A switch is coupled in series with a transformer in the power converter to control current through the transformer to provide constant output power. The off time of the switch contributes to controlling the power factor of the ballast circuit. The transformer is operated in critical conduction mode, with an indication of zero current in the transformer used to determine the control for the switch. An output of the flyback power converter provides a feedback signal to obtain constant power output based on switching intervals applied to the switch coupled to the transformer. This simplified topology reduces part counts while providing a robust control that can be flexibly applied to a number of HID lamps.

20 Claims, 3 Drawing Sheets

SIMPLIFIED TOPOLOGY FOR HID LAMPS

RELATED APPLICATION

This application is based on and claims benefit of U.S. Provisional Application No. 60/507,637, filed Sep. 30, 2003, entitled Simplified Topology for HID Lamps, to which a claim of priority is hereby made.

BACKGROUND OF THE INVENTION

1. Field of the Invention

The present invention relates generally to ballasts for HID lamps, and related more particularly to a simplified topology for a ballast to drive an HID lamp.

2. Description of Related Art

High intensity discharge (HID) lamps are highly desirable for commercial markets due to their superior light efficiency in terms of lumens produced per watt and the variety of power ranges in which they are available. As HID lamp technology as developed, manufacturers and ballast designers have come to focus on reliability and efficiency in providing a robust and simple HID lighting system. For example, lamp manufacturers typically suggest that an HID lamp be driven in an AC mode, at a low frequency and with constant power to maximize reliability.

An HID lamp having a power range of 35–150 W may use less than 100 volts for ignition, which is followed by an operating region in which voltage may drop to a few tens of volts, and current may drop to a few amperes. In this operating region, it is desirable to maintain a constant power output.

When the HID lamp is ignited, a high voltage (HV) generator is placed in series with the main power supply to obtain a few kilovolts for a cold strike ignition or a few tens of kilovolts for a hot strike ignition, primarily near the point at which ignition occurs. The HV generator is fairly well known, with a number of variations presently available in conventional designs.

Lamp manufacturers suggest that lamps be driven with an AC signal before and after ignition due to the different consumption or lifetime of lamp cathode and anode terminals if a DC signal is used. Low frequency AC signals of from about 50 to about 500 Hz is suggested due to mechanical instabilities of the lamp arc upon ignition, to avoid degradation to the lamp components or eventual complete failure of the lamp.

In addition to the practical limitations illustrated by the suggestions of the lamp manufacturers, international regulations call for a limit on the harmonic current drawn by a converter connected to an HID lamp. Accordingly, to satisfy the practical considerations and the international regulations regarding operation of an HID lamp, low frequency AC signals should be used with a limitation on the harmonic current drawn by the lamp ballast or converter.

Another factor that is important for lamp operation and power converter regulation is the power factor obtained by the ballast or converter that is connected to the public power system. It is desirable that any ballast or converter for a lamp exhibit a high power factor, such as one as close as possible to unity, so that the load appears as close as possible to purely resistive as seen by the main power lines. Power factor correction circuitry draws a sinusoidal current from the main power lines that is in phase with the sinusoidal voltage supply to obtain a high power factor. A simple and inexpensive technique for power factor correction would be highly desirable.

Another important factor that contributes to longevity of an HID lamp is to regulate the power supply to the lamp during normal running conditions. Accordingly, it is desirable to provide constant power to the lamp during normal operation to maintain an even light output and extend the longevity of the lamp.

The above constraints are desirable in addition to obtaining a low frequency AC modulation for the lamp for the practical reasons discussed above.

SUMMARY OF THE INVENTION

In accordance with the present invention, there is provided a ballast for driving an HID lamp that provides low frequency modulation, constant power to an inverter section and draws sinusoidal current from the input main power supply. The power converter detects conditions in a transformer used to convert input power to supply the inverter. The power converter control also senses an output voltage of the inverter to ensure constant power is delivered to the load. Sensing the inverter voltage output also permits the control to react to the lamp ignition. The voltage sense of the inverter output provides all the feedback needed to maintain constant power at the lamp.

The various rules used to drive the simplified HID ballast are established based on a sense of the voltage output of the inverter. One of the rules includes the on time for the switch coupled to the transformer to switch power delivered to the transformer to obtain a constant power output. Switching the switch is also conducted in accordance with obtaining a high power factor by drawing a sinusoidal input current from the input power supply. Another rule is the provision of constant lamp power while output voltage varies over a range. Each of these rules in conjunction provides a robust HID ballast control that is simple to implement, such as through a micro-controller, while providing a flexible design that can be used with a variety of HID lamps.

In accordance with one embodiment of the present invention, a ballast power converter is driven in critical mode with a variable switching frequency. The variable switching frequency depends upon the current in the transformer when transferring input power to the inverter. The switch coupled to the transformer for controlling the power transfer is operated based on the magnetizing current of the transformer going to zero.

The HID lamp is driven in a half bridge inverter configuration by a high voltage driver coupled to an oscillator or timer IC. The use of two capacitors split across the lamp load permits the use of the half bridge topology to avoid a full bridge switching configuration to reduce the cost of the overall solution. Ideally, the capacitors balance the voltage on either side of the lamp connections, but in practice are prone to some variation. By introducing a feedback signal from the power converter and one of the capacitors, the high voltage driver IC can be operated to drive the half bridge to balance the voltage between the two capacitors.

Other features and advantages of the present invention will become apparent from the following description of the invention which refers to the accompanying drawings.

DETAILED DESCRIPTION OF THE PREFERRED EMBODIMENTS

Figure 1:
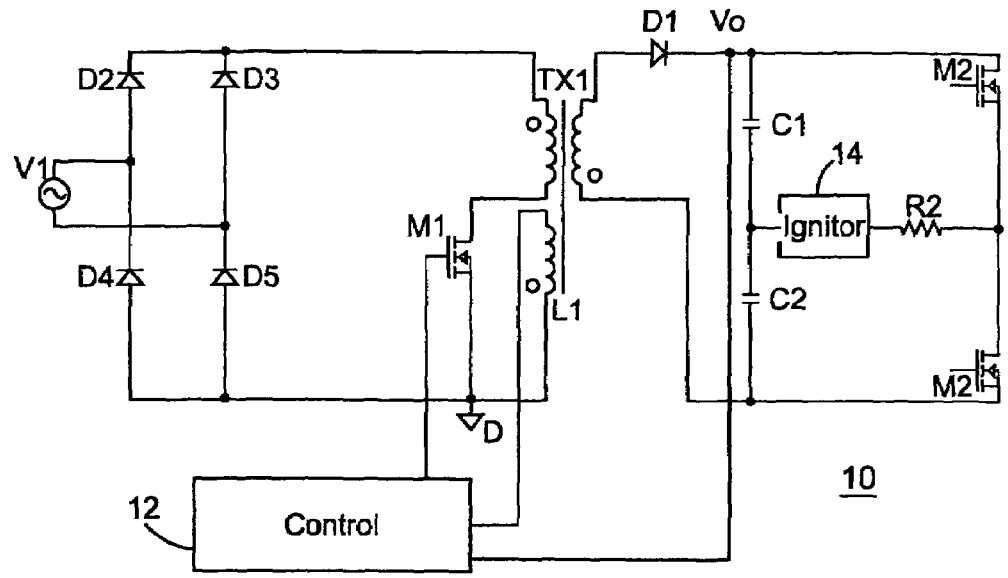
FIG. 1 is an abstract circuit diagram of an HID ballast with a simplified topology according to the present invention.

Referring now to FIG. 1, an abstract circuit diagram of an electronic ballast control for an HID is illustrated generally as circuit 10. Circuit 10 includes a transformer TX1 that receives a full wave rectified signal from the diode bridge consisting of diodes D2–D5. In accordance with a known result, if a flyback converter is operated in critical conduction mode, the output of such converter provides constant power if the main switch is driven with a constant on interval and a variable off interval, while receiving a constant input voltage. With these conditions, the output voltage and output current of the flyback converter follow a constant power law.

However, when the voltage received by the flyback converter is not constant, but rather a fullwave rectification signal like that delivered by the diode bridge consisting of diodes D2–D5 in circuit 10, a different control approach is taken. A modified control approach is especially indicated if constant power is to be delivered by the power converter while obtaining a close to unity power factor with a low total harmonic distortion (THD). A high power factor, e.g., close to unity, is achieved when the input current is fully sinusoidal and in phase with the input voltage. Under these conditions, the circuit load appears fully resistive to the input power supply or input power mains.

In accordance with the present invention, an energy transfer device such as a transformer TX1 in circuit 10 is switched in critical conduction mode. Switch M1 is illustrated as a MOSFET, but it should be apparent that any type of appropriate switch may be used, including IGBTs and other bipolar switches. A controller 12 is connected to an indicator such as an auxiliary winding L1 of transformer TX1 to determine the occurrence of the demagnetization of transformer TX1, or a zero crossing of current in the transformer. Controller 12 is also connected to the output voltage of the power converter, Vo to contribute to controlling the power converter for constant power.

A voltage V1 supplied to the bridge rectifier is a sinusoidal input main voltage, typically 110 or 230 volts, so that transformer TX1 receives a fullwave rectified signal. Capacitors C1 and C2 provide a filtering function in conjunction with diode D1, so that voltage Vo is a DC voltage supplied to the inverter composed of switches M2 and M3. The HID lamp is shown schematically as a resistor R2 and an igniter 14 in series with the lamp.

Controller 12 detects the demagnetization of transformer TX1 through auxiliary winding L1. The signal provided by auxiliary winding L1 also serves to indicate to controller 12 the point at which the off period for switch M1 occurs. Voltage Vo supplies information about the power provided by the power converter to determine the point at which point switch M1 is turned on.

Figure 2:
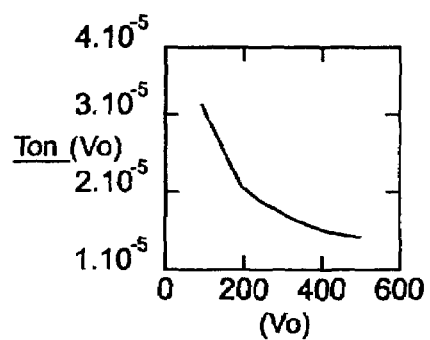
FIG. 2 is a graph showing switch on time versus output voltage for a switch transformer according to the present invention.

Referring to FIG. 2, the on time of switch M1 varies as the output voltage changes. Accordingly, unlike prior flyback power converter designs, the switch on time for switch M1 changes as the output voltage changes to achieve constant power. The relationship shown in the graph in FIG. 2 between the on time of switch M1 and the output voltage Vo obtains a suitable compensation for receiving a fullwave rectified voltage input on transformer TX1, rather than a fixed DC input. Controller 12 can be implemented to operate switch M1 in accordance with the graph in FIG. 2 in the form of a rule for operating the power converter with constant power output.

Figure 3:
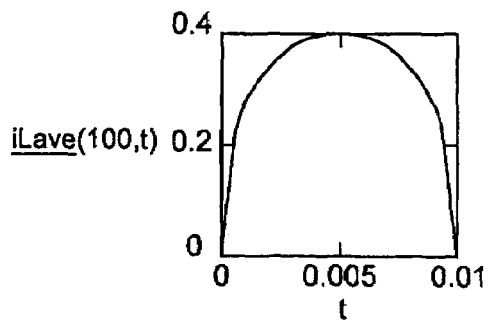
FIG. 3 is a graph illustrating a sinusoidal input current drawn to improve the power factor of the circuit according to the present invention.

Referring to FIG. 3, input current drawn by the power converter from the main power supply lines is sinusoidal on average and in phase with the input voltage to achieve a high power factor. Although the sinusoidal shape of the input current may not comply perfectly with the sinusoidal input voltage, the result is still a very good power factor with low THD for the simplified power converter design.

In FIGS. 2, 3, an exemplary embodiment is indicated where the lamp power is set to approximately 70 W and the input voltage is approximately 230 VRMS. However, it should be apparent that this exemplary embodiment represents only one of many general cases that may be easily realized by the power converter according to the present invention.

Figure 4:
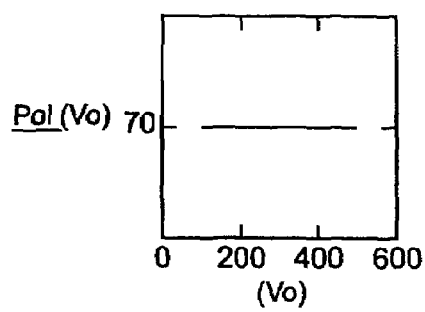
FIG. 4 is a graph illustrating constant output power versus output voltage in accordance with the present invention.

Referring now to FIG. 4, a graph illustrating the power output to the lamp as a function of output voltage is illustrated. As can be seen from the graph in FIG. 4, power is constant over output voltage Vo, and maintained at 70 W for the purposes of the exemplary circuit operation.

Referring for a moment to FIG. 1, the inverter that includes switches M2 and M3 provides low frequency modulation to the lamp represented by resistor R2. Switches M2 and M3 are arranged in a half bridge switching arrangement, where the maximum peak voltage across the lamp is limited to Vo/2.

The voltage used to ignite the lamp represented by resistor R2 may be customized by changing the turn ratio of transformer TX1 to achieve the desired voltage prior to ignition. Alternately, the time interval Ton, which represents the on time for switch M1, can be modified to generate the appropriate voltage on the output of the converter for lamp ignition, typically around 100 volts. After lamp ignition, controller 12 senses output voltage Vo and modifies switch M1 on time Ton as appropriate to conform with the rule described in the graph in FIG. 2. This simple feedback arrangement obtains all the functionality needed to completely operate the HID lamp in this simplified topology. For example, as the ignited lamp begins to absorb additional current, a decrease in output voltage Vo is observed when switch M1 on time Ton is constant. Controller 12 senses the decrease in output voltage Vo and increases switch M1 on time Ton accordingly to maintain constant power to the lamp.

The rules associated with the control illustrated in FIGS. 2–4 can be easily stored in a micro-controller memory or other programmable device to provide a simple and low cost solution in conjunction with the HID ballast topology for realizing an inexpensive but robust lighting control system. Another exemplary embodiment of controller 12 is a ROM or one time programmable memory used to drive a micro-controller or an analog PWM circuit used to operate switch M1.

Figure 5:
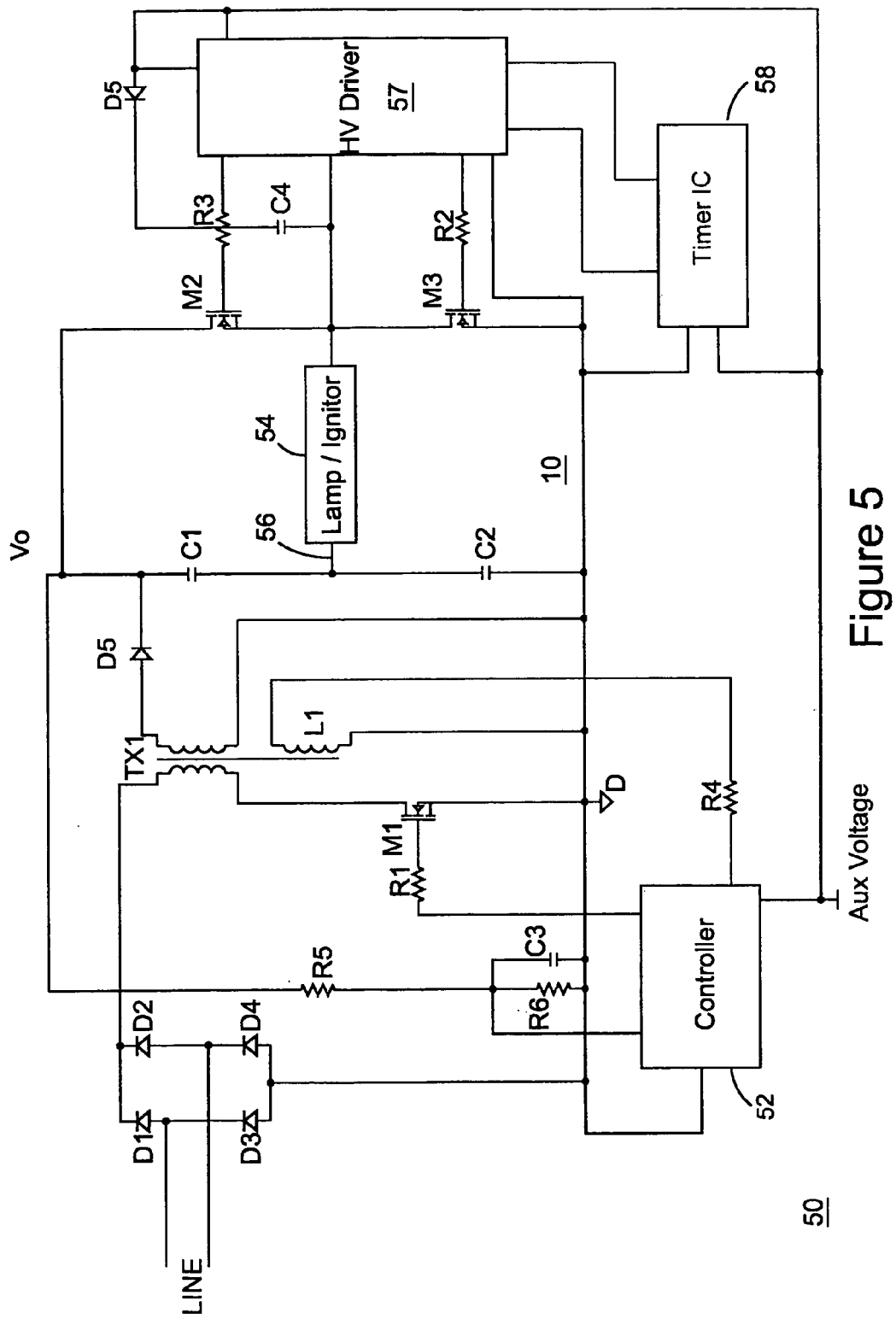
FIG. 5 is a circuit block diagram of an electronic ballast control in accordance with the present invention.

Referring now to FIG. 5, a more complete circuit block diagram of a lighting ballast circuit 50 is illustrated. Circuit 50 includes a full bridge rectifier composed of diodes D1–D4 that provides a fullwave rectified input voltage pulse train from the line input voltage supply. The output of the full bridge rectifier is typically on the order of 85 to 265

VRMS, dependent upon the voltage supplied on the input main lines. The power converter includes switch M1, transformer TX1 and diode D5, which is driven in critical conduction mode through variable switching frequency. A power output of transformer TX1 through diode D5 is the output power supplied to the inverter composed of switches M2 and M3 for supplying power to lamp and igniter 54. Transformer TX1 has an auxiliary winding L1 that can be connected to controller 52 to sense the magnetizing current in transformer TX1. When the magnetizing current in transformer TX1 goes to zero, it signals the beginning of a switching interval for switch M1. The switching interval starts with a switch on period Ton that is determined by controller 52. Controller 52 provides switch on time modulation for switch M1 according to the relationship illustrated in the graph in FIG. 2, for example. The modulation of switch M1 for switch on time Ton is derived with the power converter output voltage feedback Vo. The feedback signal Vo can be conditioned in any particular way so that it is sufficient for reception by controller 52. For example, in circuit 50, a resistor divider R5, R6 provides an appropriate voltage to controller 52 based on output voltage Vo. A capacitor C3 is used to filter the signal provided by output voltage Vo.

As output voltage Vo changes over time, the on time Ton for switch M1 also changes. For example, if output voltage Vo begins to decrease, switch M1 on time Ton is increased to deliver additional energy to transformer TX1 to increase output voltage Vo. If output voltage Vo increases over a desired amount, switch M1 on time Ton is decreased to correspondingly decrease the amount of energy transferred in transformer TX1.

The power converter illustrated in circuit 50 includes capacitors C1 and C2, which represent a divider arrangement to provide a balanced voltage value on either side of terminal 56 of lamp 54. By arranging capacitor C1 and C2 in this form, lamp 54 can be driven with the half bridge composed of switches M2 and M3 to permit a reduction in the number of switches used to provide the ballast circuit solution. Switches M2 and M3 operate in a half bridge configuration to drive lamp 54 at a low frequency to improve the longevity of lamp 54, while contributing to regulating light output. The switching half bridge composed of switches M2 and M3 usually operates at a frequency in the range of from about 200 to 500 Hz, as suggested by lamp manufacturers in typical arrangements. Due to the low frequency used to drive lamp 54, a resonant filter, typically composed of an LC circuit, is not needed to operate lamp 54.

A timer IC 58 provides the switching signals for the low frequency modulation of switches M2 and M3. The switching signals are delivered to the high voltage IC driver 57, which operates high and low side switches M2, M3, respectively. Driver 57 typically includes a level shift circuit for shifting a drive voltage supplied to switch M2 to an appropriate voltage reference, while also providing switching signals to switch M3. Driver 57 can include a number of features, such as automatic deadtime insertion, fault detection and overtemperature detection, for example. Since driver 57 includes a level shift circuit, additional isolation transformers for driving switch M2 are unnecessary.

Figure 6:
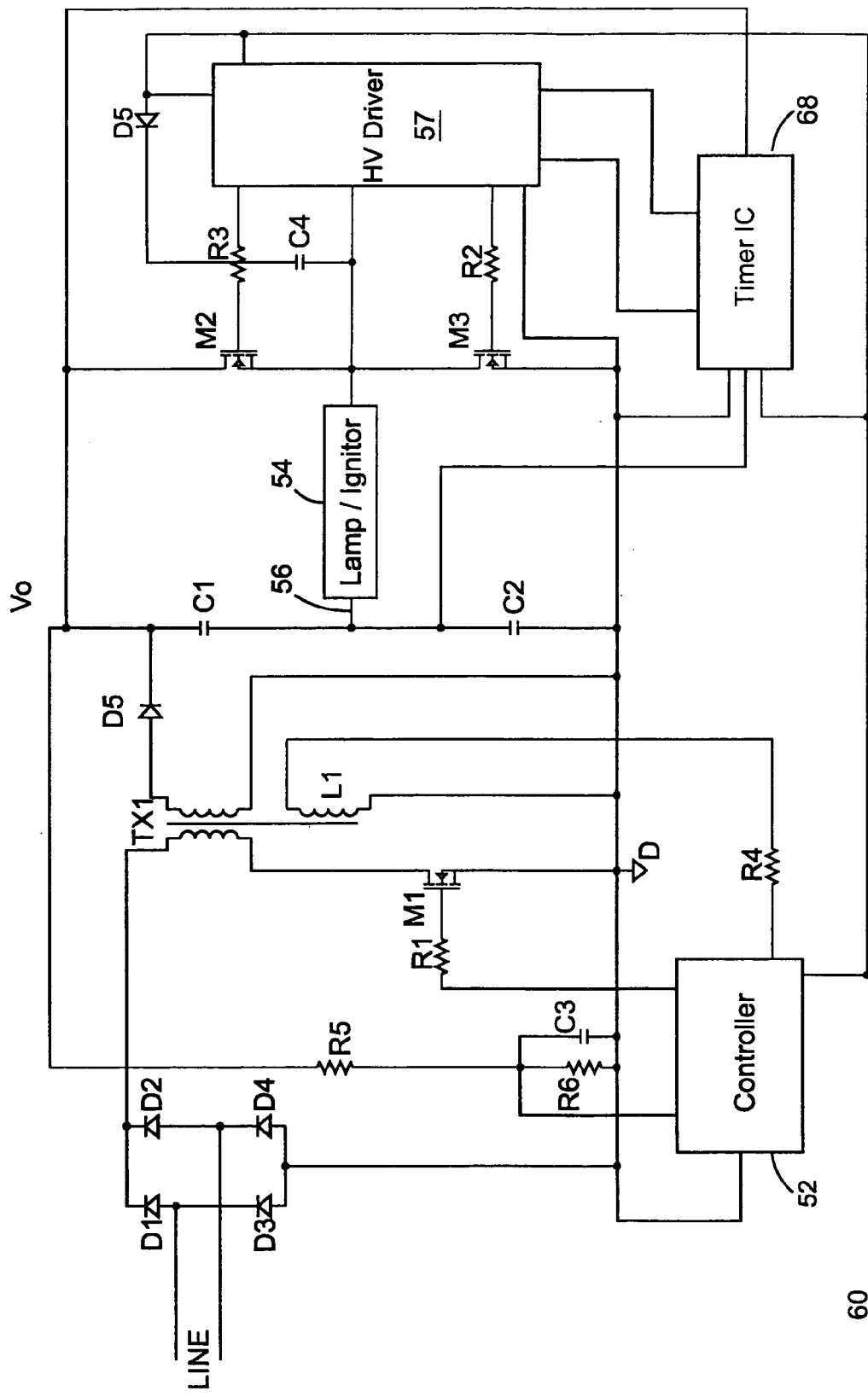
FIG. 6 is a circuit block diagram of an electronic ballast control according to another embodiment of the present invention.

Referring now to FIG. 6, another embodiment of the ballast lighting system of the present invention is illustrated as a circuit 60. In circuit 60, capacitor C1 and C2 represent practical capacitors with voltage mismatch variations that typically occur in real world applications. A balanced voltage on capacitor C1 and C2 can be obtained by drawing on the functionality of timer IC 68. Output voltage Vo is provided to timer IC 68 to measure the total voltage observed on the combination of capacitor C1 and C2. A feedback from capacitor C2 is also provided to timer IC 68. Timer IC 68 operates to provide switching signals to driver 57 so that switches M2 and M3 are operated in low frequency modulation drive lamp 64. By modifying the low frequency on time of switches M2 and M3 in the half bridge arrangement, output voltage Vo can be modified so that the voltage at capacitor C2 is one half of voltage Vo. This same voltage is present on capacitor C1. The balance of the voltages on capacitors C1 and C2 improves the ballast performance and provides a better overall system efficiency.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An HID lamp ballast power converter, comprising:
   an energy transfer device for transferring the electrical energy from an input to an output;
   a switch coupled to the energy transfer device on an input side for permitting or preventing current flow through the input side of the energy transfer device;
   an indicator coupled to the energy transfer device for determining when the energy transfer device is operating with zero current; and
   a controller coupled to the switch and the indicator to permit switching of the switch based on indicator values, wherein the controller is operable to switch the switch to operate the energy transfer device to obtain a constant power output from the energy transfer device based on an output feedback signal.

2. The circuit according to claim 1, wherein the energy transfer device is a transformer.

3. The circuit according to claim 2, wherein the indicator is an auxiliary winding of the transformer.

4. The circuit according to claim 1, further comprising a voltage signal related to an output of the energy transfer device coupled to the controller for contributing to control of the switch.

5. The circuit according to claim 4, wherein the controller is operable to modify an on time of the switch to obtain a constant power output from the energy transfer device based on the output voltage.

6. The circuit according to claim 1, wherein the controller is operable to switch the switch to operate the energy transfer device in critical conduction mode.

7. The circuit according to claim 1, wherein the controller is operable to switch the switch with a variable off time to obtain a power factor correction control.

8. The HID lamp ballast power converter of claim 1, further comprising:
   a power inverter for supplying a low frequency modulated signal to power an HID lamp; and
   a series connected pair of capacitors in the power inverter for balancing a voltage supplied to the HID lamp, wherein the power inverter is coupled to the output of the energy transfer device.

9. A flyback power converter, comprising:
   a transformer for converting an input electrical signal to an output electrical signal;
   an auxiliary winding in the transformer for indicating a magnetization state of the transformer;
   a switch coupled to an input side of the transformer for controlling current flow through the transformer input;

a voltage feedback signal coupled to the output of the transformer to provide an output feedback signal; and a controller coupled to the auxiliary winding, the switch and the output voltage indication, wherein the controller is operable to switch the switch based on values obtained from the auxiliary winding and the output voltage signal to regulate output voltage and power factor correction.

10. The power converter according to claim 9, wherein the controller is operable according to a rule based on inputting a full wave rectified signal as the input electrical signal.

11. The power converter according to claim 9, wherein the controller is operable to switch the switch to obtain a constant power output from the transformer.

12. The power converter according to claim 9, wherein the controller is operable to modify an on time of the switch to obtain a constant power output from the transformer.

13. The power converter according to claim 9, wherein the controller is operable to switch the switch with a variable off time to obtain the power factor correction.

14. The flyback power converter of claim 9, further comprising:

a power inverter for supplying a low frequency modulated signal to power an HID lamp; and a series connected pair of capacitors in the power inverter for balancing a voltage supplied to the HID lamp, wherein the power inverter is coupled to the transformer output.

15. An HID lamp ballast, comprising:

a power inverter for supplying a low frequency modulated signal to power an HID lamp;

a series connected pair of capacitors in the power inverter for balancing a voltage supplied to the HID lamp; and a power converter comprising an energy transfer device for transferring electrical energy from an input to an output;

a switch coupled to the energy transfer device on an input side for permitting or preventing current flow through the input side of the energy transfer device;

an indicator coupled to the energy transfer device for determining when the energy transfer device is operating with zero;

a controller coupled to the switch and the indicator to permit switching of the switch based on indicator values; and a voltage signal related to an output of the energy transfer device coupled to the controller for contributing to control of the switch, wherein the power inverter is coupled to the output of the energy transfer device.

16. An HID lamp ballast, comprising:

a power inverter for supplying a low frequency modulated signal to power an HID lamp;

a series connected pair of capacitors in the power inverter for balancing a voltage supplied to the HID lamp; and a power converter including a transformer for converting an input electrical signal to an output electrical signal;

an auxiliary winding in the transformer for indicating a magnetization state of the transformer;

a switch coupled to an input side of the transformer for controlling current flow through the transformer input;

a voltage feedback signal coupled to the output of the transformer to provide an output feedback signal; and a controller coupled to the auxiliary winding, the switch and the output voltage indication, wherein the controller is operable to switch the switch based on values obtained from the auxiliary winding and the output voltage signal to regulate output voltage and power factor correction, wherein the power inverter is coupled to the transformer output.

17. A method for operating a flyback power converter, comprising the steps of:

transforming an input electrical signal to an output electrical signal through a transformer;

detecting when current in the transformer input reaches zero;

measuring voltage on the transformer output;

switching a switch coupled to the transformer input to control transformer input current to regulate transformer output power and obtain power factor correction for the transformer input.

18. The method according to claim 17, wherein the step of switching the switch is controlled according to a rule related to receiving a full wave rectified input signal.

19. The method according to claim 17, further comprising the step of varying an on time of the switch to obtain constant power output from the transformer.

20. The method according to claim 17, further comprising the step of varying an off time of the switch to obtain power factor correction on the transformer input.

* * * * *